May 6, 1947. H. E. CROZIER 2,420,067
COLLET ATTACHMENT FOR LATHES OR OTHER METAL WORKING MACHINES
Filed Nov. 1, 1943

INVENTOR.
H. E. CROZIER.
BY Martin P. Smith
ATTY.

Patented May 6, 1947

2,420,067

UNITED STATES PATENT OFFICE 2,420,067

COLLET ATTACHMENT FOR LATHES OR OTHER METALWORKING MACHINES

Harold E. Crozier, Hawthorne, Calif.

Application November 1, 1943, Serial No. 508,487

4 Claims. (Cl. 279—50)

My invention relates to a collet attachment for lathes or other metal working machines and has for its principal objects, to generally improve upon and simplify the construction of the existing forms of collet attachments, particularly the nose type, and to provide a collet and collect actuating means which are simple in structure and operate to clamp the stock or work at right angles to its axis, so that in gripping and releasing the stock, there is no lengthwise movement imparted thereto.

A further object of my invention is, to provide a collet attachment of the character referred to, having a collet which is radially expansible and contractible and which is contracted to engage and grip the stock, by means of a plurality of toggle blocks controlled manually actuated means.

A further object of my invention is, to provide simple and effective means for adjusting one of the bearings for the toggle blocks, thereby enabling said blocks to occupy different positions and thus function properly with different diameters of stock.

With the foregoing and other objects in view, my invention consists in certain novel features of construction and arrangement of parts which will be hereinafter more fully described and claimed and illustrated in the accompanying drawings, in which:

Figure 1:
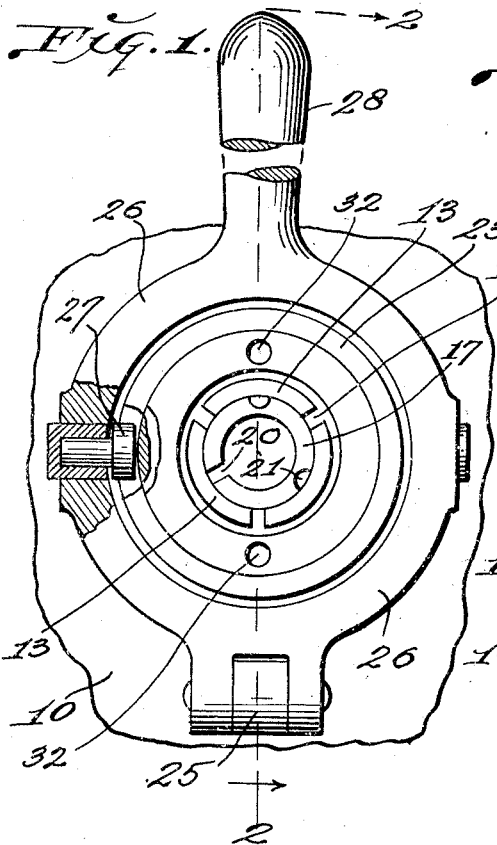
Fig. 1 is an end view of a portion of a lathe with my improved collet attachment applied thereto.
Figure 2:
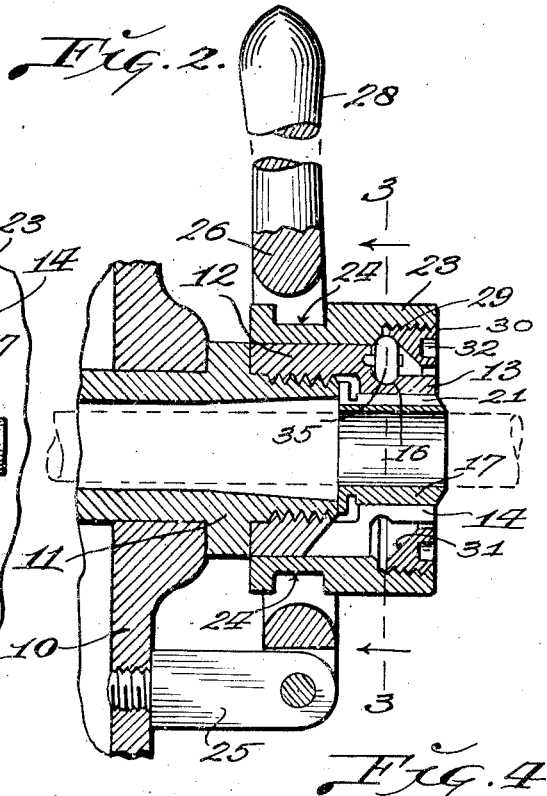
Fig. 2 is a vertical section taken on the line 2—2 of Fig. 1.
Figure 3:
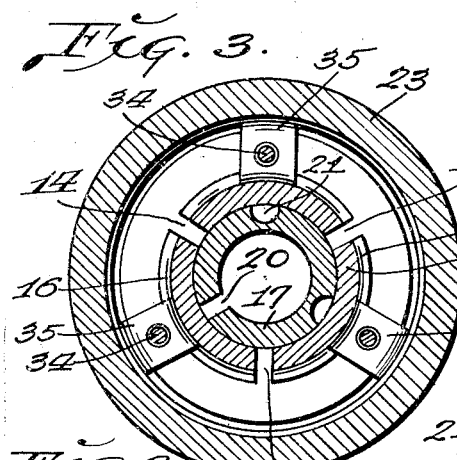
Fig. 3 is an enlarged cross section taken on the line 3—3 of Fig. 2.

Referring by numerals to the accompanying drawings which illustrate a preferred embodiment of my invention, 10 designates the end portion of a conventional lathe having a short tubular extension 11, through which the stock or work passes and screw seated on said extension, is a tubular body 12, the outer portion 13 of which is reduced in diameter and provided with a plurality of longitudinally disposed slots 14.

These slots extend short distances into the body 12 and as the latter is formed of steel or other metal having resiliency, the slotted outer portion 13 may contract and expand radially to a certain degree.

Formed in the outer face of the reduced end portion 13 adjacent the external shoulders 15 between said portion and body 12, is an annular groove 16.

The collet which is positioned in the slotted portion 13 of body 12, comprises a tubular body 17 of steel or other hard resilient metal, provided on one end with a flange 18 and formed in the outer face of said body immediately adjacent the flange, is a circumferential groove 19, for grinding relief.

Figure 5:
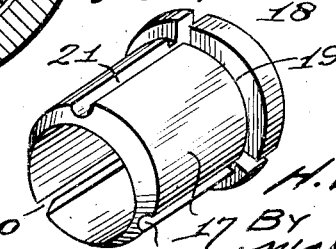
Fig. 5 is a perspective view of the collet.

This collet is split lengthwise as designated by 20, and formed in the outer surface of said body are two or more longitudinally disposed grooves 21 which extend the entire length of the body (see Fig. 5).

The construction just described enables the collet to contract and expand radially to a considerable degree.

Figure 4:
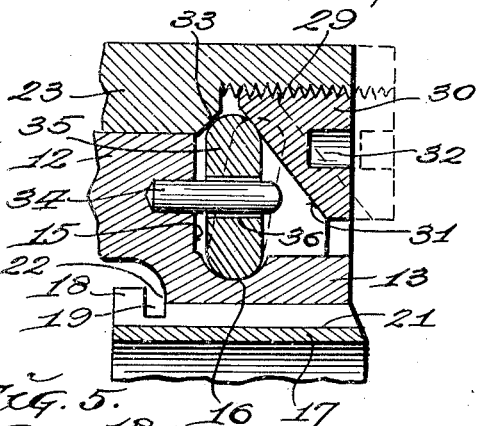
Fig. 4 is an enlarged detail section showing one of the toggle blocks utilized in my improved collet.

When the collet is properly positioned within the portion 13 of body 12, flange 18 is positioned immediately adjacent the internal shoulder 22, between said body and portion (see Fig. 4).

Mounted to slide freely upon body 12 is a sleeve 23, and formed in the outer face is a circumferential groove 24.

Pivoted to a stud or post 25 on the lathe housing below the collet attachment is the lower end of a ring yoke 26 which encircles sleeve 23, and mounted for rotation on the sides of said ring are rollers such as 27, which are positioned in groove 24 in said sleeve.

Projecting from the top of the ring yoke is a handle 28, the manipulation of which moves sleeve 23 lengthwise upon body 12.

The outer portion of the bore through sleeve 23 is increased slightly in diameter, and threaded as designated by 29 for the reception of an adjusting ring 30 having an inclined inner face 31, and formed in the outer face of said ring are recesses 32, adapted to receive a spanner wrench or like tool, utilized for screwing said ring into and out of the sleeve.

The corner of the shoulder between the portion of different diameters within sleeve 23 is cut away to form an inclined bearing surface 33, which is oppositely disposed with respect to the inclined face 31 on ring 30.

Seated in the end of body 12 outwardly from the slotted portion 13 is a plurality of pins 34, preferably three, and mounted thereon are toggle blocks 35 having longitudinally curved and transversely rounded inner and outer edges, which engage respectively in the groove 16 in member 13 and in the substantially V-shaped channel between the bevelled surface 33 and the outer portion of the inclined face 31 on ring 30 (see Fig. 4).

In order that these toggle blocks may tilt in performing their functions, the holes 36 which are formed in the blocks, are slightly larger in diameter than said pins.

When the collet is open to permit introduction or lengthwise adjustment of the stock or work, handle 28 is swung away from the lathe thereby sliding sleeve 23 outwardly upon body 12 and such movement tilts the toggle blocks into angular positions as seen in Fig. 4, thereby permitting slotted portion 13 of body 12 and collet 17 to expand.

After the stock has been entered and adjusted, the handle is swung toward the lathe, thereby correspondingly moving sleeve 23, and as the outer edges of the toggle blocks are engaged between the inclined faces 31 and 33, said blocks will be simultaneously swung into a plane at right angles to the collet and stock passing therethrough and owing to the relative sizes of the operating parts, the slotted portion 13 and slotted collet will be contracted so that the latter will firmly grip and rigidly hold the stock.

Where the parts are constructed so as to permit the toggle blocks to move slightly "past center," for instance approximately two or three thousandths of an inch, the collet will be maintained in its closed or contracted position and very little effort will be required to manipulate the handle and permit said collet to open by expansion.

The internal diameter of the collet is preferably equal to the internal diameter of the lathe spindle and thus any stock which may be accommodated by said spindle will be received and clamped by the collet.

The opening through the collet may be of any desired cross sectional shape in order to accommodate round, square or hexagonal stock.

Ring 30 may be adjusted inwardly or outwardly in sleeve 23 in order to vary the width of the groove between faces 33 and 31, thus permitting the toggle blocks to adjust themselves to the diameter of the stock or work engaged by the collet.

Figure 6:
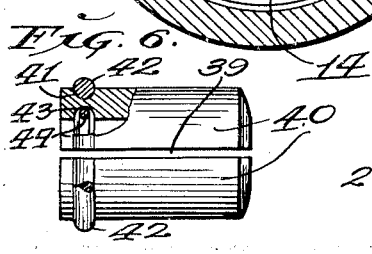
Fig. 6 is a side elevational view partly in section, of a modified form of my improved collet.

In Fig. 6 I have shown a modified form of the collet and in this construction the tubular body of the collet is provided with two or more longitudinal slots such as 39 thereby forming segments 40.

Formed in the external faces of these segments near one end are the parts of a circumferential groove 41 in which is positioned a split snap ring 42.

Formed on the inner faces of the segments, preferably in line with groove 41, are the parts of a circumferential groove 43 in which is seated a split snap ring 44 which lies beneath the effective inner surface of the segmental collet body.

The cooperative action of the rings 42 and 44 maintain the segments forming the collet body in proper assembled relation and enable same to expand and contract radially in performing its functions.

External ring 42 tends to contract and internal ring 44 tends to expand.

Among the advantages of my invention are, the application of the clamping forces through the collet at right angles to the work, thus entirely eliminating tendency of the work to move lengthwise while being gripped and released, and further, the ability to enter, adjust, release and remove the work, while the lathe spindle is rotating.

Thus it will be seen that I have provided a collet attachment for lathes and like metal working machines which is simple in structure, inexpensive of manufacture, and very effective in performing the functions for which it is intended.

It will be understood that minor changes in the size, form and construction of the various parts of my improved collet attachment may be made and substituted for those herein shown and described without departing from the spirit of the invention, the scope of which is set forth in the appended claims.

I claim as my invention:

1. In a collet attachment for lathes and like metal working machines, a fixed tubular member having an expansible portion, an expansible collet positioned within the expansible portion of said tubular member which collet is split lengthwise and provided with a plurality of externally arranged longitudinally disposed grooves, spaced apart from each other and from said split, a member arranged for sliding movement lengthwise on said fixed tubular member and having an internal inclined annular shoulder, a ring screw seated in said sliding member and having an inclined shoulder disposed opposite the inclined shoulder on said sliding member and a plurality of toggle blocks arranged with their inner ends bearing on the expansible portion of said tubular member and their outer ends bearing on the inclined shoulders on said sliding member and ring.

2. A collet attachment for lathes and the like as set forth in claim 1 and the expansible portion of said fixed member having a circumferential groove for the reception of said toggle blocks.

3. A collet attachment as set forth in claim 1 with pins seated in said fixed member and upon which said toggle blocks are loosely mounted.

4. A collet attachment as set forth in claim 1 with pins seated in said fixed member and said toggle blocks being loosely mounted on said pins.

HAROLD E. CROZIER.

REFERENCES CITED

The following references are of record in the file of this patent:

UNITED STATES PATENTS

| Number | Name | Date |
| --- | --- | --- |
| 725,346 | Krug | Apr. 14, 1903 |
| 992,957 | Gridley | May 23, 1911 |
| 2,040,678 | Buskirk | May 12, 1936 |
| 2,192,024 | Breitbarth | Feb. 27, 1940 |
| 1,017,968 | Greenleaf | Feb. 20, 1912 |
| 1,827,795 | Matthews | Oct. 20, 1931 |
| 1,864,786 | Wilkins | June 28, 1928 |
| 2,139,733 | Derrig | Dec. 13, 1938 |
| 2,407,932 | Maxwell | Sept. 17, 1946 |

FOREIGN PATENTS

| Number | Country | Date |
| --- | --- | --- |
| 458,923 | British | 1936 |